United States Patent
Shin et al.

(10) Patent No.: US 7,415,205 B2
(45) Date of Patent: Aug. 19, 2008

(54) WAVELENGTH DIVISION MULTIPLEXED SELF-HEALING PASSIVE OPTICAL NETWORK USING WAVELENGTH INJECTION METHOD

(75) Inventors: Hong-Seok Shin, Suwon-si (KR); Dae-Kwang Jung, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 478 days.

(21) Appl. No.: 10/969,445

(22) Filed: Oct. 20, 2004

(65) Prior Publication Data

US 2005/0152696 A1    Jul. 14, 2005

(30) Foreign Application Priority Data

Jan. 9, 2004    (KR) .................... 10-2004-0001754

(51) Int. Cl.
*G02F 1/00* (2006.01)
*H04J 14/00* (2006.01)

(52) U.S. Cl. .............. 398/5; 398/1; 398/2; 398/7; 398/66; 398/67; 68/70; 68/71; 68/72

(58) Field of Classification Search ............ 398/3–5, 398/70–72, 79, 84, 66, 67, 68, 69, 1, 2, 7
See application file for complete search history.

(56) References Cited

U.S. PATENT DOCUMENTS

| 6,327,400 | B1 * | 12/2001 | Harstead et al. ............ 385/22 |
| 6,597,482 | B1 * | 7/2003 | Chung et al. ............... 398/87 |
| H2075 | H * | 8/2003 | Gnauck et al. .............. 398/58 |
| 7,171,123 | B2 * | 1/2007 | Lee et al. .................. 398/82 |
| 7,174,102 | B2 * | 2/2007 | Park et al. .................. 398/66 |
| 7,283,748 | B2 * | 10/2007 | Jung et al. .................. 398/72 |

(Continued)

FOREIGN PATENT DOCUMENTS

JP     07-250028     9/1995

(Continued)

OTHER PUBLICATIONS

International Telelcommunication Union, A broadband optical access system with enhanced survivability, Jan. 2002, ITU-T Recommendation G.983.5.*

*Primary Examiner*—Kenneth Vanderpuye
*Assistant Examiner*—Daniel G Dobson
(74) *Attorney, Agent, or Firm*—Cha & Reiter, LLC (57) ABSTRACT

A wavelength division multiplexed self-healing passive optical network using a wavelength injection method includes a central office for coupling modulated multiplexed optical signals (MMOS) and broadband optical signals (BOS)for an upstream light source into one signal transmitted to a plurality of optical network units (ONUs) through a working main fiber and a protection main fiber. A remote node connects to the central office via the main fiber and protection main fiber and to the ONUs through working distribution fibers and protection distribution fibers. The remote node demultiplexes the MMOS and the (BOS) for an upstream light source. The remote node transmits demultiplexed signals to the ONUs, which receive the modulated optical signals and the BOS for an upstream light source which corresponds to predetermined ONUs, and demodulate the modulated optical signals, and modulate upstream optical signals via demultiplexed BOS for an upstream light source.

12 Claims, 6 Drawing Sheets

U.S. PATENT DOCUMENTS

2006/0153567 A1 * 7/2006 Kim et al. .................... 398/72

FOREIGN PATENT DOCUMENTS

| JP | 08-242207 | 9/1996 |
| --- | --- | --- |
| JP | 09-284224 | 10/1997 |
| JP | 2000-329963 | 11/2000 |
| JP | 2001-197006 | 7/2001 |
| JP | 2001-197010 | 7/2001 |
| JP | 2002-270949 | 9/2002 |
| JP | 2002-325073 | 11/2002 |
| JP | 2003-188853 | 7/2003 |
| JP | 2003-338788 | 11/2003 |
| JP | 2005-198286 | 7/2005 |
| JP | 2005-536078 | 11/2005 |
| WO | WO 03/063401 | 7/2003 |

* cited by examiner

WAVELENGTH DIVISION MULTIPLEXED SELF-HEALING PASSIVE OPTICAL NETWORK USING WAVELENGTH INJECTION METHOD

CLAIM OF PRIORITY

This application claims priority to an application entitled "Wavelength division multiplexed self-healing passive optical network using wavelength injection method," filed in the Korean Intellectual Property Office on Jan. 9, 2004 and assigned Serial No. 2004-1754, the contents of which are hereby incorporated by reference.

BACKGROUND OF THE INVENTION

1. Field of the Invention

The present invention relates to a self-healing passive optical network capable of detecting and healing cuts or deterioration of a feeder fiber or distribution fiber, thereby restoring the network by itself.

2. Description of the Related Art

A wavelength division multiplexing passive optical network (WDM-PON) can ensure the secrecy of communication and can easily accommodate special communication services required from each subscriber unit. The WDM-PON can enlarge channel capacity by assigning a specific wavelength to each subscriber unit and communicating with each subscriber unit. Also, the WDM-PON can easily increase the number of subscriber units by adding specific wavelengths to be assigned to new subscribers.

Generally, a WDM-PON uses a double star structure. That is, a central office (CO) and a remote node (RN) installed at an area adjacent to optical network units are connected to each other through one feeder fiber. The remote node and each optical network unit are connected to each other through a separate distribution fiber.

Multiplexed downstream optical signals are transmitted to the remote node through one feeder fiber. The multiplexed downstream optical signals are demultiplexed by a multiplexer/demultiplexer installed in the remote node and the demultiplexed signals are transmitted to subscriber units through the distribution fibers separately connected to optical network units.

Upstream signals outputted from the subscriber units are transmitted to the remote node through the distribution fibers separately connected to the optical network units. Then the multiplexer/demultiplexer installed in the remote node multiplexes the upstream signal according to each optical network unit, and transmits the multiplexed signal to the central office.

In the WDM-PON as described above, when an unexpected error occurs, such as a cut of a feeder fiber or a distribution fiber, a large quantity of transmitted data may be lost even though the error time period is short. For this reason, the error must be quickly detected and corrected.

Accordingly, it is necessary to develop a self-healing passive optical network (PON) capable of quickly detecting an error, such as a cut of a feeder fiber or a distribution fiber, on an installed optical link and correcting the error by itself.

Figure 1A:
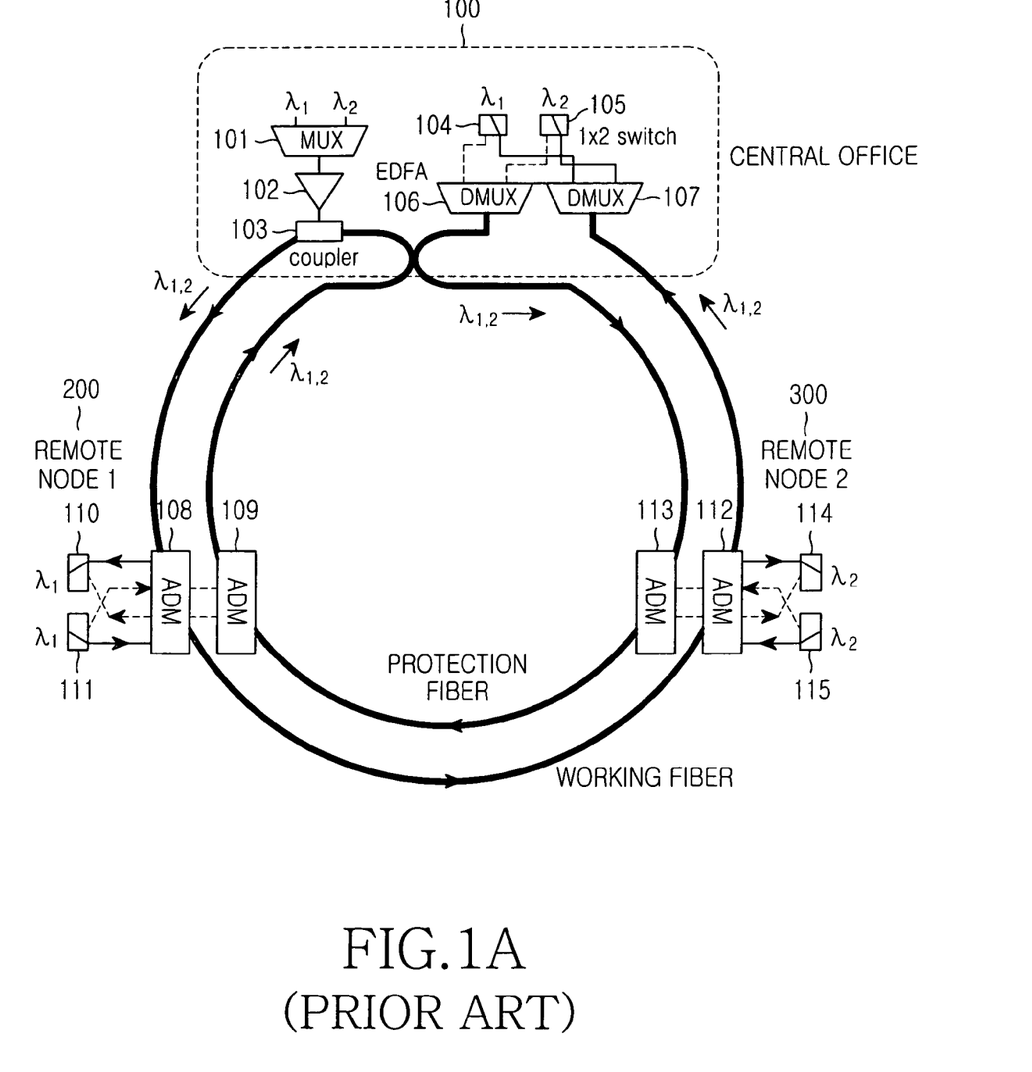
FIGS. 1a and 1b are views of a conventional wavelength division multiplexed self-healing ring network.
Figure 1B:
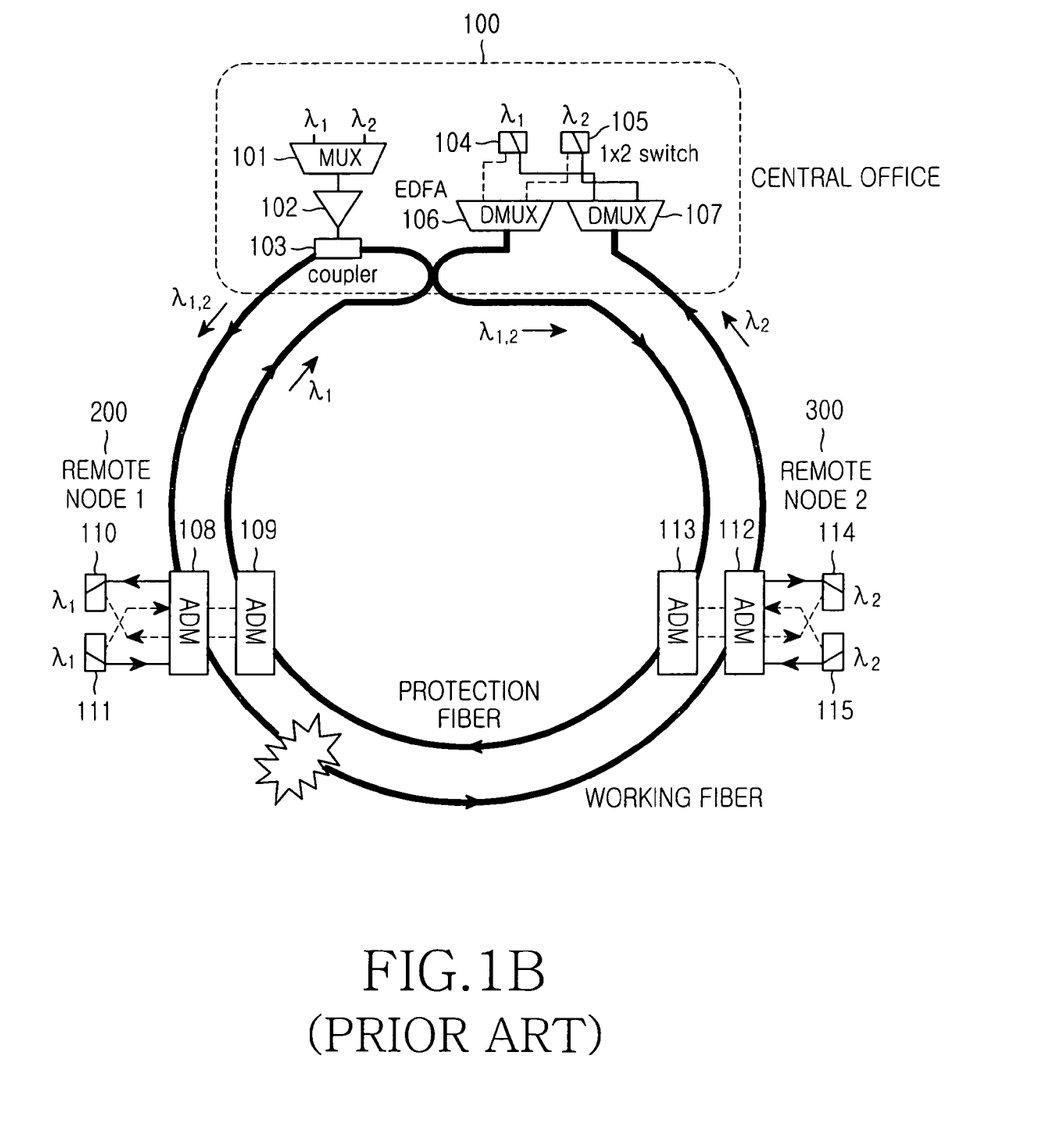

FIGS. 1a and 1b are views of a conventional WDM self-healing ring network.

Generally, in a WDM optical communication network, a ring network connecting each node in a ring type is mainly used to smoothly cope with an error such as a cut of a transmission optical fiber.

The aforementioned conventional self-healing ring network connects a central office 100 to a first remote node 200 by means of two strands of optical fiber. Further, the self-healing ring network connects the central office 100 to a second remote node 300 by means of two strands of optical fiber.

Here, the two strands of optical fiber are a working fiber and a protection fiber. The central office 100 in a normal state transmits optical signals equal to each other, into which several wavelengths (e.g., $\lambda 1$, $\lambda 2$) of signals are multiplexed, through the two strands of optical fibers. The first remote node 200 or the second remote node 300 drops the optical signals inputted through the two strands of optical fiber to add/drop multiplexers 108 and 109 or add/drop multiplexers 112 and 113 and receives an optical signal having good characteristics from among the inputted optical signals by means of optical switching devices 110 and 111 or optical switching devices 114 and 115.

Meanwhile, the first remote node 200 or the second remote node 300 transmits optical signals equal to each other through the two strands of optical fiber. Then, the central office 100 demultiplexes optical signals according to each wavelength, and selects and receives one of two signals by means of optical switching devices 104 and 105.

FIG. 1b is a view illustrating a case in which an abnormality such as a cut of an optical fiber occurs in a working fiber.

When an abnormality occurs in the working fiber, the conventional self-healing ring network performs the following self-healing operation.

If the second remote node 300 cannot receive a second channel $\lambda 2$ through the working fiber in a counterclockwise rotation it is assumed that the working fiber between the first remote node 200 and the second remote node 300 is cut., When it is assumed that the working fiber is cut, the second remote node 300 receives the second channel $\lambda 2$ transmitted in a clockwise rotation through the protection fiber. Since the first remote node 200 cannot add and transmit a first channel $\lambda 1$ through the working fiber in a counterclockwise rotation, the first remote node 200 switches the optical switching device 110 to transmit the first channel $\lambda 1$ through the protection fiber in a clockwise rotation.

The aforementioned conventional self-healing ring network is efficient when a central office and a plurality of remote nodes are spaced away from each other by about several tens of kilometers. However, it is insufficient to introduce the aforementioned ring network structure to a PON which connects a central office to a remote node and connects the remote node to an optical network unit. That is, since a conventional PON has a star structure, a self-healing method having a concept different from a self-healing method in a ring network structure must be developed.

Furthermore, in the case of a WDM-PON using a wavelength injection method, an upstream/downstream injection light source exists and the directionality of the light source must be considered.

SUMMARY OF THE INVENTION

The present invention has been made to solve the aforementioned problems occurring in the prior art. An object of the present invention is to provide a wavelength division multiplexed self-healing passive optical network capable of detecting a cut of or deterioration of a feeder fiber or a distribution fiber. It is a further object of the present invention to correct an error due to the cut or deterioration by itself in a passive optical network having a star structure.

In order to accomplish the aforementioned objects, according to one aspect of the present invention, a wavelength division multiplexed self-healing passive optical network is provided using a wavelength injection method. The wavelength division multiplexed self-healing passive optical network may include a central office for coupling modulated multiplexing optical signals and broadband optical signals for an upstream light source. These signals may be combined into one signal and transmitted to a plurality of optical network units as a coupled signal through a working main fiber and a protection main fiber. The remote node may connect to the central office through the working main fiber and the protection main fiber and to the optical network units through working distribution fibers and protection distribution fibers. The remote node may demultiplex the modulated multiplexing optical signals and the broadband optical signals for an upstream light source. The remote node may transmit the demultiplexed signals to the optical network units. The optical network units may receive the modulated optical signals and the broadband optical signals for an upstream light source, which are transmitted from the remote node and correspond to predetermined optical network units, optically demodulate the modulated optical signals, and modulate upstream optical signals by means of the demultiplexed broadband optical signals for an upstream light source.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

A preferred embodiment according to the present invention will be described below with reference to the accompanying drawings. Detailed description of known functions and configurations incorporated herein will be omitted when it may make the subject matter of the present invention unclear.

Figure 2:
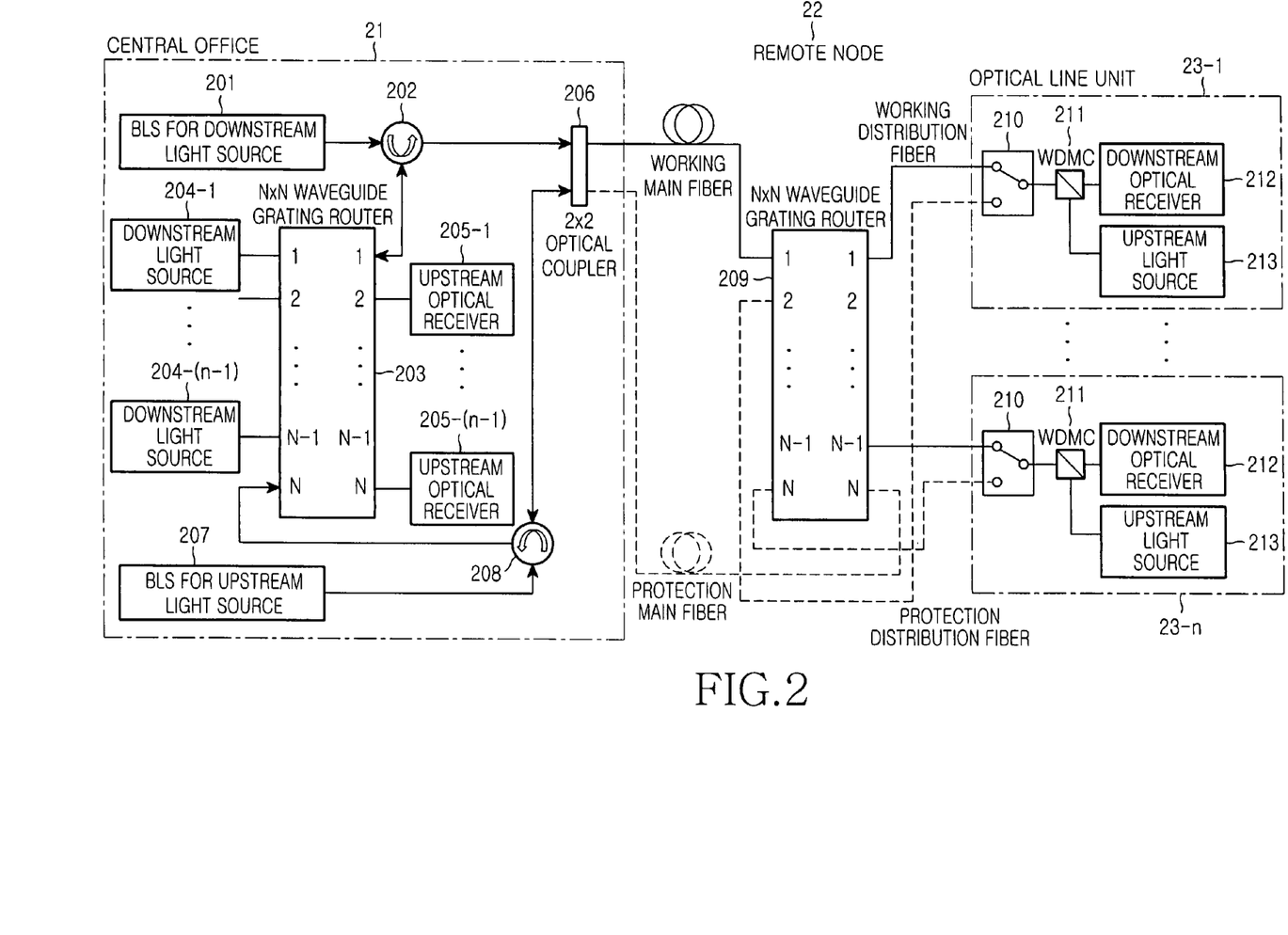
FIG. 2 is a block diagram of a wavelength division multiplexed self-healing passive optical network using a wavelength injection method according to one embodiment of the present invention.

FIG. 2 is a block diagram of a wavelength division multiplexed self-healing passive optical network using a wavelength injection method according to one embodiment of the present invention.

As shown in FIG. 2, the wavelength division multiplexed self-healing passive optical network using the wavelength injection method includes a central office 21, one strand of working fiber and one strand of protection fiber connecting the central office 21 to a remote node 22, an N×N multiplexer/demultiplexer (waveguide grating router, wherein N is an integer greater than 1) 209 located in the remote node 22, working fibers and protection fibers connecting the remote node 22 to optical network units 23-1 to 23-($n$-1), and the optical network units 23-1 to 23-($n$-1). The central office 21 includes downstream light sources 204-1 to 204-($n$-1), upstream optical receivers 205-1 to 205-($n$-1), an N×N multiplexer/demultiplexer (waveguide grating router) 203, a broadband light source (BLS) 201 for a downstream light source, a broadband light source 207 for an upstream light source, a first and a second circulators 202 and 208 for determining an optical path, and a 2×2 optical coupler 206. Each of the optical network units 23-1 to 23-($n$-1) includes a downstream optical receiver 212, an upstream light source 213, a wavelength division multiplexer (WDMC) 211 for dividing/coupling an upstream/downstream signal, and a 1×2 optical switching device 210.

Operation of the wavelength division multiplexed self-healing passive optical network using the wavelength injection method will be described with reference to FIG. 2.

First, a downstream signal will be described. A broadband optical signal of the broadband light source 201 for a downstream light source in the central office 21 is inputted into a first terminal of one side of the N×N waveguide grating router 203 through the first circulator 202, and is then demultiplexed. That is, the optical signal inputted into a first terminal of one side of the N×N waveguide grating router 203 is demultiplexed into (n-1) number of optical signals corresponding to a first through an (n-1)$^{th}$ terminal on the other side of the N×N waveguide grating router 203.

Each of the demultiplexed optical signals as described above is injected into each of the downstream light sources 204-1 to 204-($n$-1), assigned with respect to each optical network unit, and is then modulated according to transmission data.

The modulated optical signals are then inputted into the first through the (n-1)$^{th}$ terminal of the other side of the N×N waveguide grating router 203, and are then multiplexed into one optical signal. The multiplexed optical signal is outputted to a first terminal of one side of the N×N waveguide grating router 203.

The multiplexed modulation optical signal outputted to a first terminal of one side of the N×N waveguide grating router 203 is sent to the 2×2 optical coupler 206 through the first circulator 202, is coupled to a broadband optical signal of the broadband light source 207 for upstream light source by the 2×2 optical coupler 206, and is transmitted to the working main fiber and the protection main fiber.

The coupled optical signal sent from the central office 21 to the remote node 22 through the working main fiber is inputted into a first terminal of one side of the N×N waveguide grating router 209 located in the remote node 22. Meanwhile, the coupled optical signal sent from the central office 21 to the remote node 22 through the protection main fiber is inputted to an N$^{th}$ terminal of the other side of the N×N waveguide grating router 209 located in the remote node 22. The optical signal transmitted from the central office 21 in this way is demultiplexed by the N×N waveguide grating router 209 and then is transmitted to each of the optical network units 23-1 to 23-($n$-1).

The coupled optical signal sent from the central office 21 to the remote node 22 through the working main fiber is inputted into a first terminal of one side of the N×N waveguide grating router 209 located in the remote node 22, is demultiplexed into (n-1) number of optical signals corresponding to a first through an (n-1)$^{th}$ terminal of the other side of the N×N waveguide grating router 209, and then is transmitted to each of the optical network units 23-1 to 23-(n-1) through the working distribution fiber. The coupled optical signal sent from the central office 21 to the remote node 22 through the protection main fiber is inputted into the $N^{th}$ terminal of the other side of the N×N waveguide grating router 209 located in the remote node 22, is demultiplexed into (n-1) number of optical signals corresponding to the second through the $N^{th}$ terminal of one side of the N×N waveguide grating router 209, and then is transmitted to each of the optical network units 23-1 to 23-(n-1) through the protection distribution fiber.

The working distribution fiber and the distribution fiber are connected to each of the optical network units 23-1 to 23-(n-1). For clarity, an operation of the optical network unit 23-1 will be described below as an example.

The optical signals transmitted to the optical network unit 23-1 through the working protection fiber and the protection distribution fiber are inputted to two input nodes of the 1×2 optical switching device 210. Typically, the 1×2 optical switching device 210 is switched to the input node connected to the working distribution fiber. The optical signal inputted through the 1×2 optical switching device 210 is inputted to the wavelength division multiplexer 211, and then is wavelength division demultiplexed. Then, the modulated optical signal of the coupled signal is inputted into the downstream optical receiver 212 and the broadband optical signal of the broadband light source for upstream light source 207 of the coupled signal is injected into the upstream light source 213, and they are used for modulation of upstream data of the optical network unit 23-1.

Next, an upstream signal will be described. When the broadband optical signal of the broadband light source for upstream light source 207 transmitted from the central office 21 is inputted and injected into the upstream light source 213, the optical network unit 23-1 modulates the upstream signal with a preset wavelength.

The modulated upstream signal passes through the wavelength division multiplexer (WDMC) 211. Then, the modulated upstream signal is transmitted to the remote node 22 through the working distribution fiber currently connected by the 1×2 optical switching device 210. In this case, it is assumed that the 1×2 optical switching device 210 is connected to the working distribution fiber.

An upstream signal of each of the optical network units 23-1 to 23-(n-1) transmitted to the remote node 22 is multiplexed by the N×N waveguide grating router 209 and then is transmitted to the central office 21 through the working main fiber.

Here, the modulated optical signals transmitted from the optical network units 23-1 to 23-(n-1) to the remote node 22 through the working distribution fiber are inputted into the first through the $(N-1)^{th}$ terminal of the other side of the N×N waveguide grating router 209 located in the remote node 22. The inputted optical signals are multiplexed by the N×N waveguide grating router 209 and the multiplexed optical signal is outputted to a first terminal of one side of the N×N waveguide grating router 209. Then, the multiplexed optical signal is transmitted to the central office 21 through the working main fiber. The modulated upstream signals transmitted from the optical network units 23-1 to 23-(n-1) to the remote node 22 through the protection distribution fiber are inputted into the second through the $N^{th}$ terminal of one side of the N×N waveguide grating router 209 located in the remote node 22, are multiplexed by the N×N waveguide grating router 209, and the multiplexed optical signal is outputted to the $N^{th}$ terminal of the other side of the N×N waveguide grating router 209. Then, the multiplexed optical signal is transmitted to the central office 21 through the protection main fiber.

The upstream signal passing through the 2×2 optical coupler 206 and the second circulator 208 located in the central office 21 is inputted to the $N^{th}$ terminal of one side of the N×N waveguide grating router 203, and is demultiplexed into (n-1) number of optical signals corresponding to the second through the $N^{th}$ terminal of the other side of the N×N waveguide grating router 203. Then, the demultiplexed signals are inputted into the upstream optical receivers 205-1 to 205-(n-1) according to the optical network units 23-1 to 23-(n-1), and then are converted into electrical signals.

Figure 3:
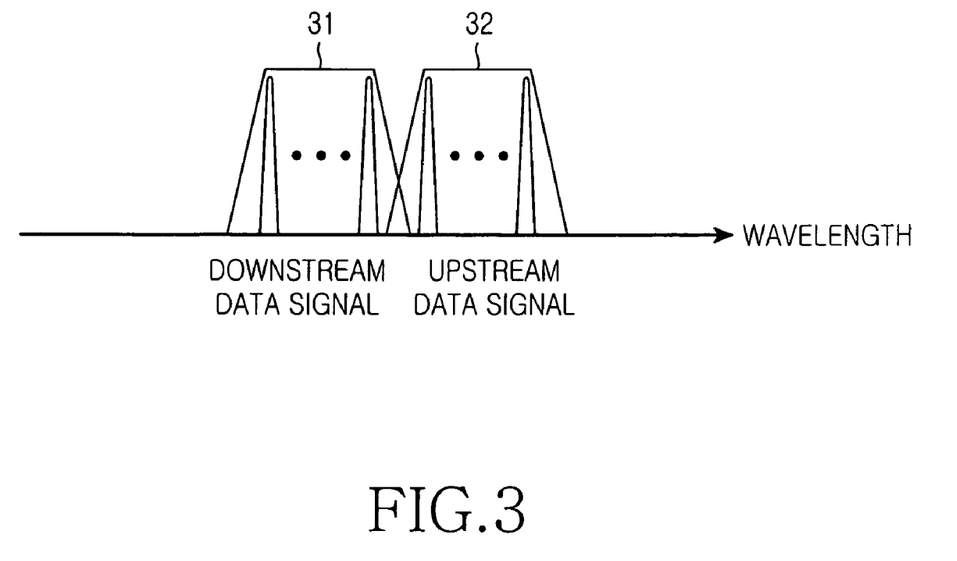
FIG. 3 shows a wavelength range of a downstream light source and a wavelength range of an upstream light source according to one embodiment of the present invention.

FIG. 3 is a view showing a wavelength range of a downstream light source and a wavelength range of an upstream light source according to one embodiment of the present invention.

As shown in FIG. 3, the wavelength range 31 of the downstream light source and the wavelength range 32 of the upstream light source according to the present invention are distinguished from each other in the bi-directional wavelength division multiplexed self-healing passive optical network transmitting an upstream signal and a downstream signal simultaneously using one strand of optical fiber. That is, since the waveguide grating routers 203 and 209 used as multiplexers/demultiplexers have a periodic pass characteristic with a free spectral range, an upstream/downstream signal can be multiplexed/demultiplexed simultaneously by means of one of the waveguide grating routers 203 and 209 even though the upstream wavelength range and the downstream wavelength range are distinguished from each other.

Figure 4:
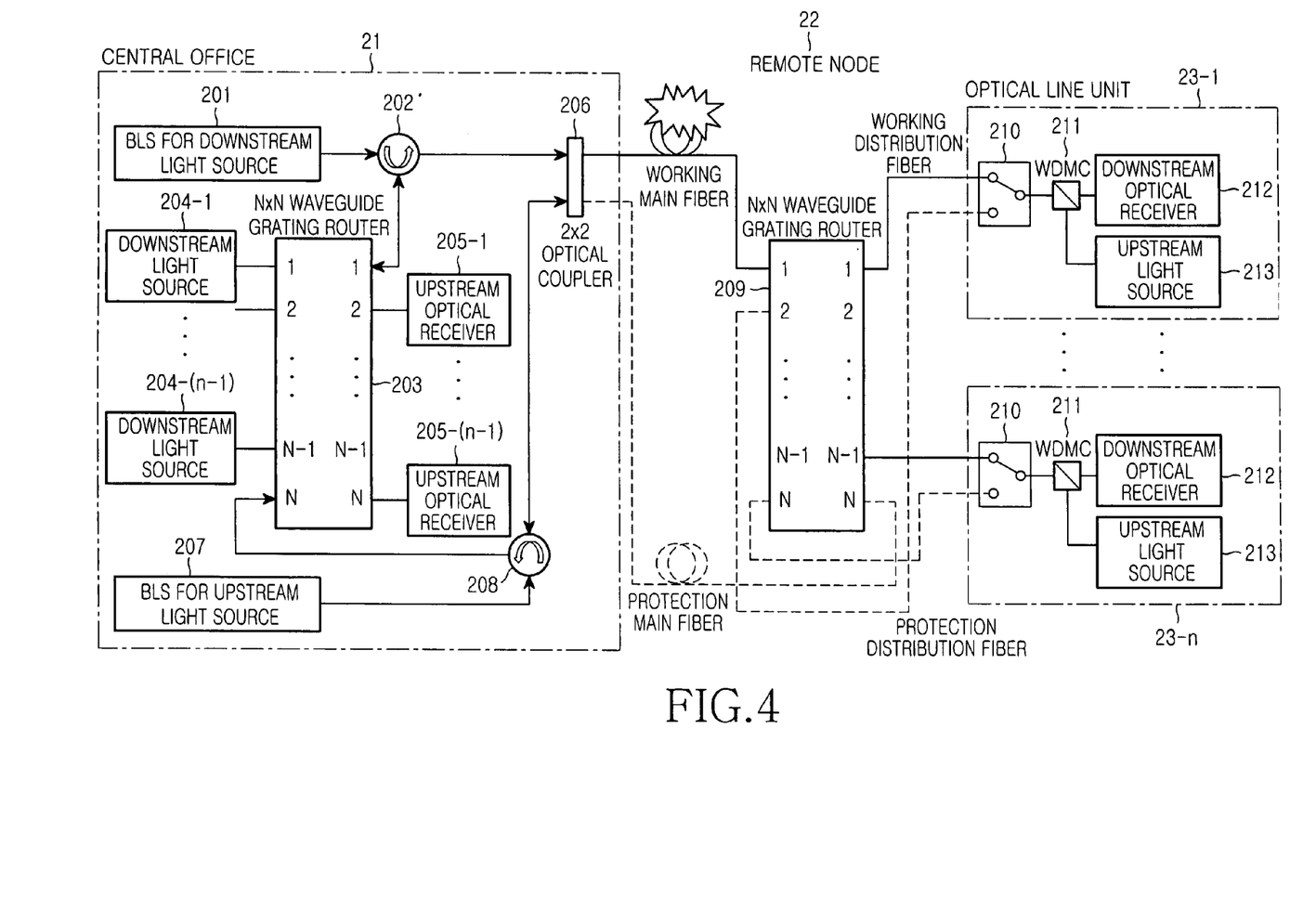
FIG. 4 is a block diagram illustrating a case in which an abnormality occurs in a working main fiber in a wavelength division multiplexed self-healing passive optical network using a wavelength injection method according to one embodiment of the present invention.

FIG. 4 is a block diagram illustrating a case in which an abnormality occurs in a working main fiber in a wavelength division multiplexed self-healing passive optical network using a wavelength injection method according to one embodiment of the present invention.

As shown in FIG. 4, when an abnormality occurs in the working main fiber in the wavelength division multiplexed self-healing passive optical network using the wavelength injection method according to the present invention, since a downstream transmission signal and a broadband optical signal of a broadband light source for upstream light source transmitted from the central office 21 disappear, the optical signals are not transmitted to the working distribution fiber connected to each of the optical network units 23-1 to 23-(n-1). Accordingly, the state of the 1×2 optical switching device 210 in each of the optical network units 23-1 to 23-(n-1) is switched, thereby enabling communication between the central office 21 and each of the optical network units 23-1 to 23-(n-1) to be performed through the protection main fiber and the protection distribution fiber as shown in FIG. 4.

Each of the optical network units 23-1 to 23-(n-1) informs the central office 21 of the state of the 1×2 optical switching device 210, and the central office 21 analyzes the state of the 1×2 optical switching device 210. Therefore, an existence or absence of abnormality of the working main fiber between the central office 21 and the remote node 22 can be checked.

Figure 5:
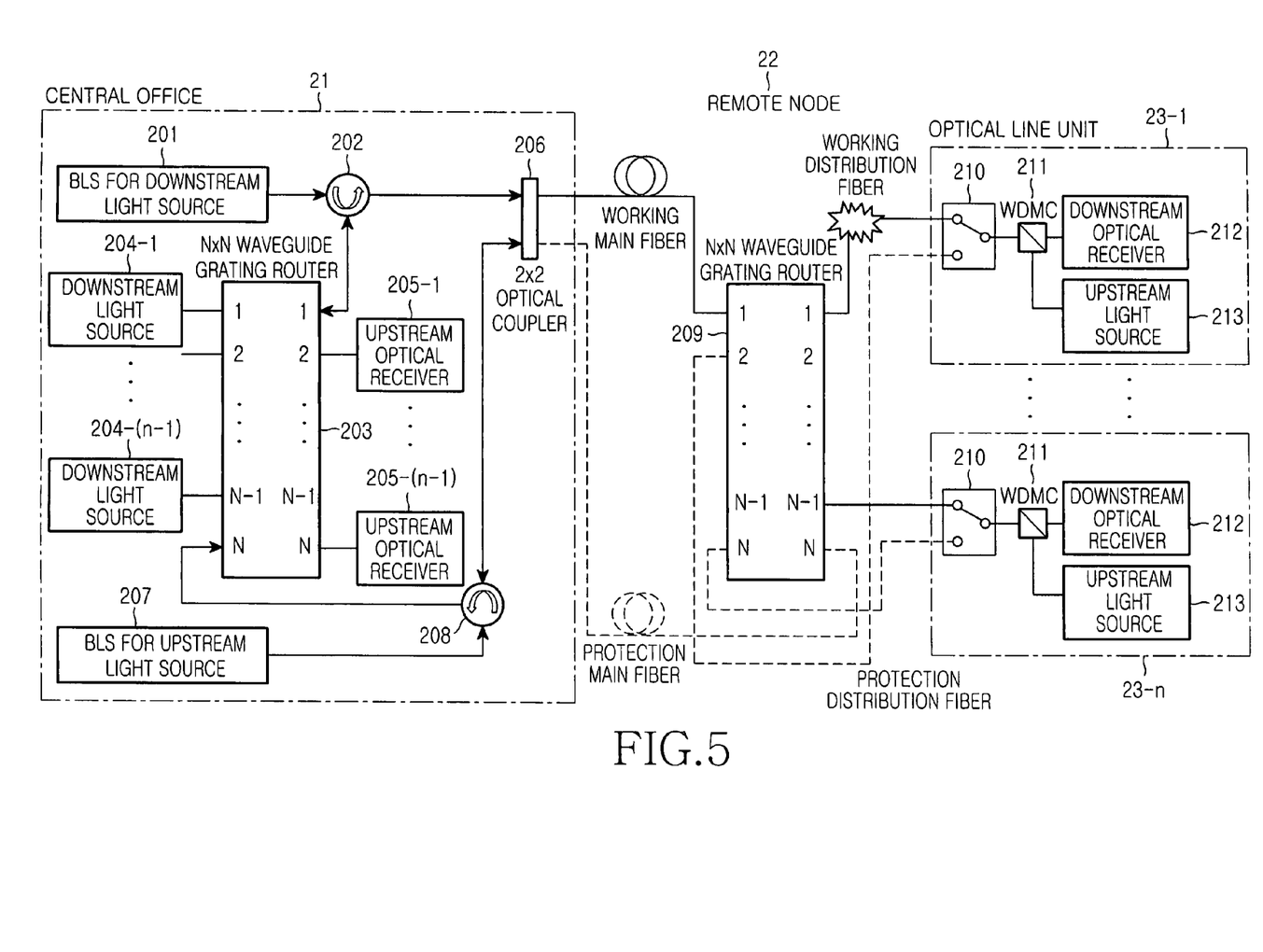
FIG. 5 is a block diagram illustrating a case in which an abnormality occurs in a working distribution fiber in a wavelength division multiplexed self-healing passive optical network using a wavelength injection method according to one embodiment of the present invention.

FIG. 5 is a block diagram illustrating a case in which an abnormality occurs in a working distribution fiber in a wavelength division multiplexed self-healing passive optical network using a wavelength injection method according to one embodiment of the present invention.

As shown in FIG. 5, when an abnormality occurs in the working distribution fiber in the wavelength division multiplexed self-healing passive optical network using the wavelength injection method according to the present invention (the embodiment of the present invention examples a case in which an abnormality occurs in the working distribution fiber connected to the optical network unit 23-1), since an input of a signal received in the downstream optical receiver 212 disappears, the state of the 1×2 optical switching device 210 in the optical network unit 23-1 is switched. Therefore, the optical network unit 23-1 receives a downstream signal through the protection distribution fiber. Here, the states of the 1×2 optical switching devices 210 in the remaining optical network units 23-2 to 23-(n-1) are not changed. Further, the central office 21 receives an upstream transmission signal corresponding to the optical network unit 23-1 through the protection main fiber, and continuously receives upstream transmission signals corresponding to the remaining optical network units 23-2 to 23-(n-1) through the working main fiber.

The optical network unit 23-1 informs the central office 21 of the state of the 1×2 optical switching device 210, so that an existence or absence of abnormality of the distribution fiber between the remote node 22 and the optical network unit 23-1 can be checked.

As described above, the present invention provides a wavelength division multiplexed self-healing passive optical network using a wavelength injection method to transmit an upstream signal, a downstream signal, and a broadband optical signal for injection through working fibers and protection fibers, thereby improving efficiency of an optical fiber.

Further, according to the present invention, a central office and a remote node each use one N×N waveguide grating router, and an abnormality, such as a cut of an optical fiber, is quickly detected by means of a protection fiber connecting the central office to an optical network unit, and the detected abnormality is quickly healed. Therefore, a network can be managed economically and efficiently.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wavelength division multiplexed self-healing passive optical network using a wavelength injection method, the wavelength division multiplexed self-healing passive optical network comprising:
    a central office for coupling modulated multiplexing optical signals and broadband optical signals for upstream light source which are to be transmitted to a plurality of optical network units through a working main fiber and a protection main fiber, into one signal and transmitting the coupled signal;
    a remote node connected to the central office through the working main fiber and the protection main fiber, the remote node connected to the optical network units through working distribution fibers and protection distribution fibers, the remote node demultiplexing the modulated multiplexing optical signals and the broadband optical signals for upstream light source transmitted from the central office through the working main fiber and the protection main fiber, and the remote node transmitting the demultiplexed signals to the optical network units; and
    optical network units for receiving the modulated optical signals and the broadband optical signals for upstream light source, which are transmitted from the remote node and correspond to predetermined optical network units, optically demodulating the modulated optical signals, and modulating upstream optical signals by means of the demultiplexed broadband optical signals for upstream light source, wherein the central office comprises:
    a broadband light source for downstream light source for providing a plurality of downstream light sources with broadband optical signals for providing injection light;
    a first N×N multiplexer/demultiplexer for performing a 1×(n-1) multiplexing/demultiplexing operation for demultiplexing the broadband optical signal from the broadband light source for downstream light source to transmit the demultiplexed optical signals to the downstream light sources, multiplexing the modulated optical signals from the downstream light sources to transmit the multiplexed optical signal, performing a 1×(n-1) multiplexing/demultiplexing operation for receiving the upstream optical signal from the remote node to demultiplex the received optical signal, and transmitting the demultiplexed optical signals to multiple upstream optical receivers;
    the downstream light sources using a wavelength injection method for receiving the optical signals demultiplexed by the first N×N multiplexer/demultiplexer, and optically modulating the received optical signals for data transmission to the optical network units;
    a broadband light source for upstream light source for providing the optical network units with broadband optical signals for providing injection light for the upstream optical signal;
    a 2×2 optical coupler for coupling the modulated multiplexing optical signals and the broadband optical signals for upstream light source having been transmitted from the first N×N multiplexer/demultiplexer, and transmitting the coupled signal through the working main fiber and the protection main fiber;
    a first circulator for providing the first N×N multiplexer/demultiplexer with the broadband optical signals from the broadband light source for downstream light source, providing the 2×2 optical coupler with the modulated multiplexing optical signals from the first N×N multiplexer/demultiplexer, and determining an optical path;
    a second circulator for providing the 2×2 optical coupler with the broadband optical signals from the broadband light source for upstream light source, providing the first N×N multiplexer/demultiplexer with an upstream transmission signal from the remote node inputted from the 2×2 optical coupler, and determining an optical path; and
    the upstream optical receivers for receiving the upstream transmission signals from the remote node, which have been demultiplexed by the first N×N multiplexer/demultiplexer.

2. The optical network as in claim 1, wherein each of optical network units comprises:
    a 1×2 optical switching device connected to the remote node through one strand of working distribution fiber and one strand of protection distribution fiber, for receiving the modulated optical signals corresponding to the predetermined optical network units and the broadband optical signals for upstream light source demultiplexed by the remote node, and for performing a switching when an abnormality occurs;
    a wavelength division multiplexer for wavelength division multiplexing the modulated optical signals corresponding to the predetermined optical network units and the broadband optical signals for upstream light source demultiplexed by the remote node, and transmitting the demultiplexed signals;

a downstream optical receiver for receiving the modulated optical signals corresponding to the predetermined optical network units from the wavelength division multiplexer; and an upstream light source for receiving the broadband optical signals for upstream light source demultiplexed by the remote node from the wavelength division multiplexer, and optically modulating upstream data.

3. A wavelength division multiplexed self-healing passive optical network using a wavelength injection method, the wavelength division multiplexed self-healing passive optical network comprising:

a central office for coupling modulated multiplexing optical signals and broadband optical signals for an upstream light source, which are to be transmitted to a plurality of optical network units through a working main fiber and a protection main fiber, into one signal and transmitting the coupled signal;

a remote node connected to the central office through the working main fiber and the protection main fiber, the remote node connected to the optical network units through working distribution fibers and protection distribution fibers, the remote node demultiplexing the modulated multiplexing optical signals and the broadband optical signals for upstream light source transmitted from the central office through the working main fiber and the protection main fiber, and the remote node transmitting the demultiplexed signals to the optical network units; and optical network units for receiving the modulated optical signals and the broadband optical signals for upstream light source, which are transmitted from the remote node and correspond to predetermined optical network units, optically demodulating the modulated optical signals, and modulating upstream optical signals by means of the demultiplexed broadband optical signals for upstream light source, wherein the remote node comprises an N×N multiplexer/demultiplexer for performing a 1×(n-1) multiplexing/demultiplexing operation for demultiplexing the modulated optical signals and the broadband optical signals for upstream light source, which have been transmitted as one optical signal through the working main fiber, transmitting the demultiplexed optical signals to the optical network units through the working distribution fiber, multiplexing modulated upstream optical signals fiber the optical network units, and transmitting the multiplexed signal to the central office, and performing a 1×(n-1) multiplexing/demultiplexing operation for demultiplexing the modulated optical signals and the broadband optical signals for upstream light source, which have been transmitted as one optical signal through the protection main fiber, transmitting the demultiplexed optical signals to the optical network units through the protection distribution fiber, multiplexing the modulated upstream optical signals from the optical network units, and transmitting the multiplexed signal to the central office.

4. The optical network as in claim 1, wherein the first N×N multiplexer/demultiplexer uses a waveguide grating router.

5. The optical network as in claim 3, wherein the N×N multiplexer/demultiplexer uses a waveguide grating router.

6. The optical network as in claim 2, wherein, when an abnormality occurs in the working main fiber connecting to the central office and the remote node, a connection state of each of the 1×2 optical switching devices located in each of the optical network units is switched, so that the central office and the remote node communicate with each other through the protection main fiber.

7. The optical network as in claim 6, wherein all optical network units communicate with the remote node through the protection distribution fiber.

8. The optical network as in claim 2, wherein, when an abnormality occurs in a certain working distribution fiber connecting to the remote node and each of the optical network units, a connection state of a 1×2 optical switching device located in an optical network unit connected to the working distribution fiber in which the abnormality has occurred is switched, such that the optical network unit connected to the working distribution fiber in which the abnormality has occurred and the remote node communicate with each other through the protection distribution fiber.

9. The optical network as in claim 8, wherein remaining optical network units, excepting the optical network unit connected to the working distribution fiber in which the abnormality has occurred, and the remote node communicate with each other through the working distribution fiber.

10. The optical network as in claim 2, wherein, according to whether an output of a downstream signal received in the optical network unit exists or not, an existence or absence of an abnormality of the working main fiber or the working distribution fiber is understood, and a connection state of the 1×2 optical switching device is then switched.

11. A wavelength division multiplexed self-healing passive optical network using a wavelength injection method, the wavelength division multiplexed self-healing passive optical network comprising:

a central office for coupling modulated multiplexing optical signals and broadband optical signals for an upstream light source, which are to be transmitted to a plurality of optical network units through a working main fiber and a protection main fiber, into one signal and transmitting the coupled signal;

a remote node connected to the central office through die working main fiber and the protection main fiber, the remote node connected to the optical network units through working distribution Fibers and protection distribution fibers, the remote node demultiplexing the modulated multiplexing optical signals and the broadband optical signals for upstream light source transmitted from the central office through the working main fiber and the protection main fiber, and the remote node transmitting the demultiplexed signals to the optical network units; and optical network units for receiving the modulated optical signals and the broadband optical signals for upstream light source, which are transmitted from the remote node and correspond to predetermined optical network units, optically demodulating the modulated optical signals, and modulating upstream optical signals by means of the demultiplexed broadband optical signals for upstream light source, wherein each of the optical network units comprises:

a 1×2 optical switching device connected to the remote node through one strand of working distribution fiber and one strand of protection distribution fiber, for receiving the modulated optical signals corresponding to the predetermined optical network units and the broadband optical signals for upstream light source demultiplexed by the remote node, and for performing a switching when an abnormality occurs;

a wavelength division multiplexer for receiving and demultiplexing the coupled signal from the central office from one of the working distribution fiber and the protection distribution fiber via the 1×2 optical switching device;

a downstream optical receiver for receiving the modulated optical signals corresponding to the predetermined optical network units from the wavelength division multiplexer; and an upstream light source for receiving the broadband optical signals for upstream light source demultiplexed by the remote node from the wavelength division multiplexer, and optically modulating upstream data;

wherein the central office recognizes a connection state of the 1×2 optical switching device sent from the optical network unit, and checks whether or not an abnormality occurs in the main fiber connecting the central office and the remote node.

12. A wavelength division multiplexed self-healing passive optical network using a wavelength injection method, the wavelength division multiplexed self-healing passive optical network comprising:

a central office for coupling modulated multiplexing optical signals and broadband optical signals for an upstream light source, which arc to be transmitted to a plurality of optical network units through a working main fiber and a protection main fiber, into one signal and transmitting the coupled signal;

a remote node connected to the central office through the working main fiber and the protection main fiber, the remote node connected to the optical network units through working distribution fibers and protection distribution fibers, the remote node demultiplexing the modulated multiplexing optical signals and the broadband optical signals for upstream light source transmitted from the central office through the working main fiber and the protection main fiber, and the remote node transmitting the demultiplexed signals to the optical network units; and optical network units for receiving the modulated optical signals and the broadband optical signals for upstream light source, which are transmitted from the remote node and correspond to predetermined optical network units, optically demodulating the modulated optical signals, and modulating upstream optical signals by means of the demultiplexed broadband optical signals for upstream light source, wherein each of the optical network units comprises;

a 1×2 optical switching device connected to the remote node through one strand of working distribution fiber and one strand of protection distribution fiber, for receiving the modulated optical signals corresponding to the predetermined optical network units and the broadband optical signals for upstream light source demultiplexed by the remote node, and for performing a switching when an abnormality occurs;

a wavelength division multiplexer for receiving and demultiplexing the coupled signal from the central office from one of the working distribution fiber and the protection distribution fiber via the 1×2 optical switching device;

a downstream optical receiver for receiving the modulated optical signals corresponding to the predetermined optical network units from the wavelength division multiplexer; and an upstream light source for receiving the broadband optical signals for upstream light source demultiplexed by the remote node from the wavelength division multiplexer, and optically modulating upstream data, wherein the central office recognizes a connection state of the 1×2 optical switching device sent from the optical network unit and checks whether or not an abnormality occurs in the distribution fibers connecting the remote node and the optical network units.

* * * * *